US008607299B2

(12) United States Patent
Baker

(10) Patent No.: US 8,607,299 B2
(45) Date of Patent: Dec. 10, 2013

(54) METHOD AND SYSTEM FOR ENFORCING A SECURITY POLICY VIA A SECURITY VIRTUAL MACHINE

(75) Inventor: Arthur H. Baker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 10/832,798

(22) Filed: Apr. 27, 2004

(65) Prior Publication Data

US 2005/0257243 A1 Nov. 17, 2005

(51) Int. Cl.
*H04L 9/00* (2006.01)

(52) U.S. Cl.
USPC .................. 726/1; 726/2; 718/1; 718/100

(58) Field of Classification Search
USPC ..................................... 726/1, 2; 718/1, 100
See application file for complete search history.

(56) References Cited

U.S. PATENT DOCUMENTS

| 4,792,895 A * | 12/1988 | Tallman .......................... 718/1 |
| 5,974,549 A | 10/1999 | Golan |
| 6,125,447 A | 9/2000 | Gong |
| 6,397,242 B1 * | 5/2002 | Devine et al. ..................... 718/1 |
| 6,496,847 B1 * | 12/2002 | Bugnion et al. .................. 718/1 |
| 6,505,300 B2 | 1/2003 | Chan et al. |
| 6,546,546 B1 | 4/2003 | Van Doorn |
| 6,560,774 B1 | 5/2003 | Gordon et al. |
| 6,658,571 B1 | 12/2003 | O'Brien et al. |
| 6,658,573 B1 | 12/2003 | Bischof et al. |
| 6,732,179 B1 * | 5/2004 | Brown et al. ................. 709/229 |
| 6,802,054 B2 * | 10/2004 | Faraj .............................. 717/128 |
| 6,938,247 B2 * | 8/2005 | Czajkowski .................. 717/151 |
| 6,944,699 B1 * | 9/2005 | Bugnion et al. .............. 710/269 |
| 6,961,941 B1 * | 11/2005 | Nelson et al. ................. 719/319 |
| 6,973,493 B1 * | 12/2005 | Slaughter et al. ............. 709/225 |
| 7,035,870 B2 * | 4/2006 | McGuire et al. .......... 707/103 R |
| 7,082,598 B1 * | 7/2006 | Le et al. ........................ 717/127 |
| 7,117,481 B1 * | 10/2006 | Agesen et al. ................ 717/120 |
| 7,149,510 B2 * | 12/2006 | Hansson et al. .............. 455/418 |
| 7,203,944 B1 * | 4/2007 | van Rietschote et al. ..... 718/104 |

(Continued)

FOREIGN PATENT DOCUMENTS

| EP | 1 271 313 A2 | 1/2003 |
| EP | 1596298 A1 | 11/2005 |

(Continued)

OTHER PUBLICATIONS

Arnold, Ken and Gosling, James. "The Java Programming Language" © 2006 Sun Microsystems Inc. pp. xv, xvi, 5, 6, 11, 16, and 122-124.*

(Continued)

*Primary Examiner* — Darren B Schwartz
*Assistant Examiner* — Thomas Gyorfi
(74) *Attorney, Agent, or Firm* — Perkins Coie LLP

(57) ABSTRACT

A method and system for enforcing a security policy encoded in an instruction set of a security virtual machine is provided. A security system provides a security virtual machine that executes security programs expressed in the instruction set of the security virtual machine. The security system stores the security program in an instruction store of the security virtual machine. When a security enforcement event occurs, the security virtual machine executes the instructions of its instruction store using data of the security enforcement event to enforce the security policy.

20 Claims, 11 Drawing Sheets

(56) References Cited

U.S. PATENT DOCUMENTS

| | | | |
|---|---|---|---|
| 7,478,388 B1 * | 1/2009 | Chen et al. | 718/1 |
| 7,657,937 B1 * | 2/2010 | Kumar | 726/23 |
| 2002/0073063 A1 | 6/2002 | Faraj | |
| 2002/0184520 A1 | 12/2002 | Bush | |
| 2002/0194241 A1 | 12/2002 | Griffin et al. | |
| 2003/0097360 A1 | 5/2003 | McGuire et al. | |
| 2003/0115313 A1 | 6/2003 | Kanada et al. | |
| 2003/0181193 A1 * | 9/2003 | Wilhelmsson et al. | 455/403 |
| 2003/0204550 A1 | 10/2003 | Lutter | |
| 2003/0224769 A1 * | 12/2003 | Solve et al. | 455/418 |
| 2003/0229794 A1 | 12/2003 | Sutton et al. | |
| 2005/0044301 A1 * | 2/2005 | Vasilevsky et al. | 711/1 |

FOREIGN PATENT DOCUMENTS

| | | |
|---|---|---|
| GB | 2 365 561 | 2/2002 |
| JP | 200083049 A | 9/2001 |
| JP | 2004126854 A | 4/2004 |
| KR | 10-2002-0033859 A | 8/2002 |
| WO | WO01/65366 | 9/2001 |
| WO | WO-03050662 A1 | 6/2003 |
| WO | WO-03104981 A2 | 12/2003 |

OTHER PUBLICATIONS

Pilz, Marcus. "Java Bytecode Compilation—a Special Case of Binary Translation" Reference dated Feb. 9, 1999 as verified by the Internet Archive http://web.archive.org. Original URL: http://www.ifi.unizh.ch/richter/people/pilz/thesis/Thesis.html.*

Haggar, Peter. "Java bytecode: Understanding bytecode makes you a better programmer" © 2001 IBM Inc. http://www-128.ibm.com/developerworks/ibm/library/it-haggar_bytecode/.*

"Class Pattern (java.util.regex)" © 2003 Sun Microsystems Inc. http://java.sun.com/j2se/1.4.2/docs/api/java/util/regex/Pattern.html.*

Microsoft Windows for Workgroups—Glossary. http://www.microsoft.com/technet/archive/wfw7_agloss.mspx (pp. 1 and 11).*

D. Lammers et al. "EPF: Leading-edge RISC processors cut power to the core" Published May 3, 1999 from EETimes.com http://www.eetimes.com/conf/epf/showArticle.jhtml;jsessionid=XW1BOYCBIXJ4UQSNDLPCKHSCJUNN2JVN?articleID=18301890&kc=2446&printable=true.*

Godmar Back et al. "Processes in KaffeOS: Isolation, Resource Management, and Sharing in Java" Proceedings of the 4$^{th}$ Symposium on Operating Systems Design & Implementation, Oct. 2000. (14 pages) http://www.cs.utah.edu/flux/papers/kaffeos-osdi00.pdf.*

Godmar Back et al. "Drawing the Red Line in Java" Proceeding on the 7$^{th}$ Workshop on Hot Topics in Operating Systems, Mar. 1999 (6 pages).*

Definition of "context switch" from Wikipedia, as originally published on Feb. 22, 2004. http://en.wikipedia.org/w/index.php?title=Context_switch&oldid=2483770.*

Ted Neward. "java.security.Policy: When 'java.policy' Just Isn't Good Enough" © 2001 Ted Neward http://www.theserverside.com/tt/articles/content/dm_javaPolicy/JavaSec.pdf.*

Wikipedia article for "virtual machine" published on Apr. 11, 2004 (4 pages) http://en.wikipedia.org/w/index.php?title=Virtual_machine&oldid=3158238&printable=yes.*

Munro, Jay. "Virtual Machines & VMWare, Part I" Published Dec. 21, 2001 on Extremetech.com (26 pages) http://www.extremetech.com/print_article2/0,1217,a%253D20322,00.asp.*

Oaks, Scott. "Java Security, 2nd Edition" © 2001 O'Reilly Media, Inc. Excerpt from Chapter 4 (pp. 53-76).*

G. Popek et al. "Formal Requirements for Virtualizable Third Generation Architectures" Communications of the ACM, Jul. 1974, vol. 17, No. 7. (pp. 412-421).*

M. Holliday. "System Calls and Interrupt Vectors in an Operating Systems Course" SIGCSE '97, © 1997 ACM (pp. 53-57).*

"VMware GSX Server User's Manual" Published no later than Mar. 8, 2003 as verified by the Internet Archive (558 pages) http://web.archive.org/web/20030308034334/www.vmware.com/pdf/gsx25_manual.pdf.*

"I/O: CS416: Operating Systems Design" © 1999-2001 Department of Computer Science, Rutgers University. (34 pages) http://www.cs.rutgers.edu/~ricardob/courses/cs416/web/lectures/io.ppt.*

Fay, D.; , "An architecture for distributed applications on the Internet: overview of Microsoft's .NET platform," Parallel and Distributed Processing Symposium, 2003. Proceedings. International , vol., no., pp. 7 pp., Apr. 22-26, 2003 doi: 10.1109/IPDPS.2003.1213196 URL: http://ieeexplore.ieee.org/stamp/stamp.jsp?tp=&arnumber=1213196&isnumber=27277.*

Powell, Robert et al. "C# and the .NET Perspective" © 2001 Sams Inc. Excerpt from Chapter 2 (20 pages total).*

Burton, Kevin. ".NET Common Language Runtime Unleashed" © 2002 Sams. Excerpts from Chapter 16 and Appendices A & B (80 pages total).*

Juval Lowy. "Programming .NET Components, Second Edition" © 2005 O'Reilly Media Inc. Excerpt from Chapter 12 (pp. 434-510).*

Don Box, Chris Sells. "Essential .Net, vol. 1: The Common Language Runtime" © 2002 Addison Wesley Professional. Excerpt from Chapter 9 (pp. 199-231).*

David Chappell. "Understanding .NET: A Tutorial and Analysis" © 2002 Addison-Wesley Professional. Excerpt from Chapters 3-5 (pp. 42-103).*

Begel, A. et al., "BPF+: Exploiting Global Data-flow Optimization in a Generalized Packet Filter Architecture," ACM SIGCOMM Computer Communication Review, Proceedings of the Conference on Applications, Technologies, Architectures, and Protocols for Computer Communication, vol. 29, Issue 4, Aug. 1999, 12 pages.

Chandranmenon, G. P. et al., "Trading Packet Headers for Packet Processing," IEEE/ACM Transactions on Networking, vol. 4, No. 2, Apr. 1996, 12 pages.

Dunlap, G. W. et al., "ReVirt: Enabling Intrusion Analysis through Virtual-Machine Logging and Replay," Proceedings of the 2002 Symposium on Operating Systems Design and Implementation (OSDI), 14 pages.

McCanne, S. et al., "The BSD Packet Filter: A New Architecture for User-level Packet Capture," Berkeley, California, Dec. 19, 1992, 11 pages.

Popek, G. J. et al., "A Verifiable Protection System," ACM SIGPLAN Notices, Proceedings of the International Conference on Reliable Software, vol. 10, Issue 6, Apr. 1975, pp. 294-304.

Salisbury, A. B., "Microprogrammable Computer Architectures, Computer Design and Architecture Series," 1976, American Elsevier Publishing Company, Inc., New York, New York, pp. 41-43.

Australian Patent Office Search Report, Singapore Patent Application No. SG200501470-9, Microsoft Corporation, Aug. 21, 2006.

Venners, Bill, "Java-Security: How to Install the Security Manager and Customize your Security Policy," Java World, Nov. 30, 1997 (5 pages).

Lindholm, T. and Yellin, F., "The Structure of the Java Virtual Machine," The Java TM Virtual Machine Specification, Second Edition, Chapter 3, Dec. 31, 1999 (22 pages).

European Search Report for European Patent Application No. 05102869.4, Oct. 4, 2005 (3 page).

Notice of Allowance for Japanese App. No. 2005-088743 dated Dec. 22, 2011, 6 pages.

\* cited by examiner m
01 - immediate data
10 - dynamic data
11 - literal data s
01 - syscall parameter
10 - process control block index - s = 01
001xxx - string table
010xxx - integer table
100xxx - block table index - s = 10
0 - application id
1 - session id of thread

METHOD AND SYSTEM FOR ENFORCING A SECURITY POLICY VIA A SECURITY VIRTUAL MACHINE

TECHNICAL FIELD

The described technology relates generally to enforcing a security policy to block an undesired behavior by a computer program.

BACKGROUND

Software systems, such as operating systems and file systems, provide application programming interfaces through which application programs can access the services of the software systems. An application program interface may provide functions with parameters for performing a specified service. For example, a file system may have a function (also referred to as a "system call") for creating a file. That function may have parameters that specify a file location, file name, file type, file size, and so on of the file to be created. When an application program invokes a function, it passes actual parameters corresponding to the formal parameters defined for the function. The function may perform certain checks on the actual parameters to ensure that they are valid. For example, the create file function may ensure that the specified file type is valid. If a parameter is not valid, then the function returns an error to the application program.

Software systems can be extremely complex for a variety of reasons. A software system may seek to be backward compatible with all prior versions of that software system. In such a case, the software system may need to support all the functions of the application program interface of the prior versions. Since new functions are typically added with each version, the number of functions can be very large and their interactions complex. Some software systems may also include software components developed by different divisions of the same company or by different companies. The interactions of these components can also be quite complex.

It has become increasingly important for software systems to ensure that their application programming interfaces are not vulnerable to either inadvertent misuse or intentional attack. One vulnerability of a software system may be through the parameters of its application programming interface. When the functions of prior versions are combined with those of newer versions, and when components from different developers are integrated, the existing parameter validation performed by the functions may not be sufficient to ensure correct behavior of the functions. For example, an application programming interface of a file system developed by one company may be integrated with a file server developed by another company. The maximum file size parameter of the application programming interface may be larger than that supported by the file server. In such a case, a file size that is acceptable to the application programming interface may cause problems with the file server. As another example, a system administrator may want to limit the maximum file size even further, but the system administrator may have no available means to enforce that limitation.

It would be desirable to have a mechanism for enforcing security policies and, in particular, security policies that specify valid conditions for parameters of application program interfaces.

SUMMARY

A method and system for enforcing a security policy is provided by a security virtual machine. The security virtual machine includes a processor engine, an instruction store, a data store, and an instruction pointer. The security virtual engine executes a security program specified using an intermediate language that is compiled from a high-level language representation of the security policy. The security program is loaded into the instruction store for execution. When a security enforcement event occurs, such as the invoking of a function of an application programming interface, data from the security enforcement event is stored in the data store and the processor engine starts fetching and executing the instructions for the security program from the instruction store. The instructions specify actions to be taken to enforce the security policy based on the data of the security enforcement event.

DETAILED DESCRIPTION

Figure 1:
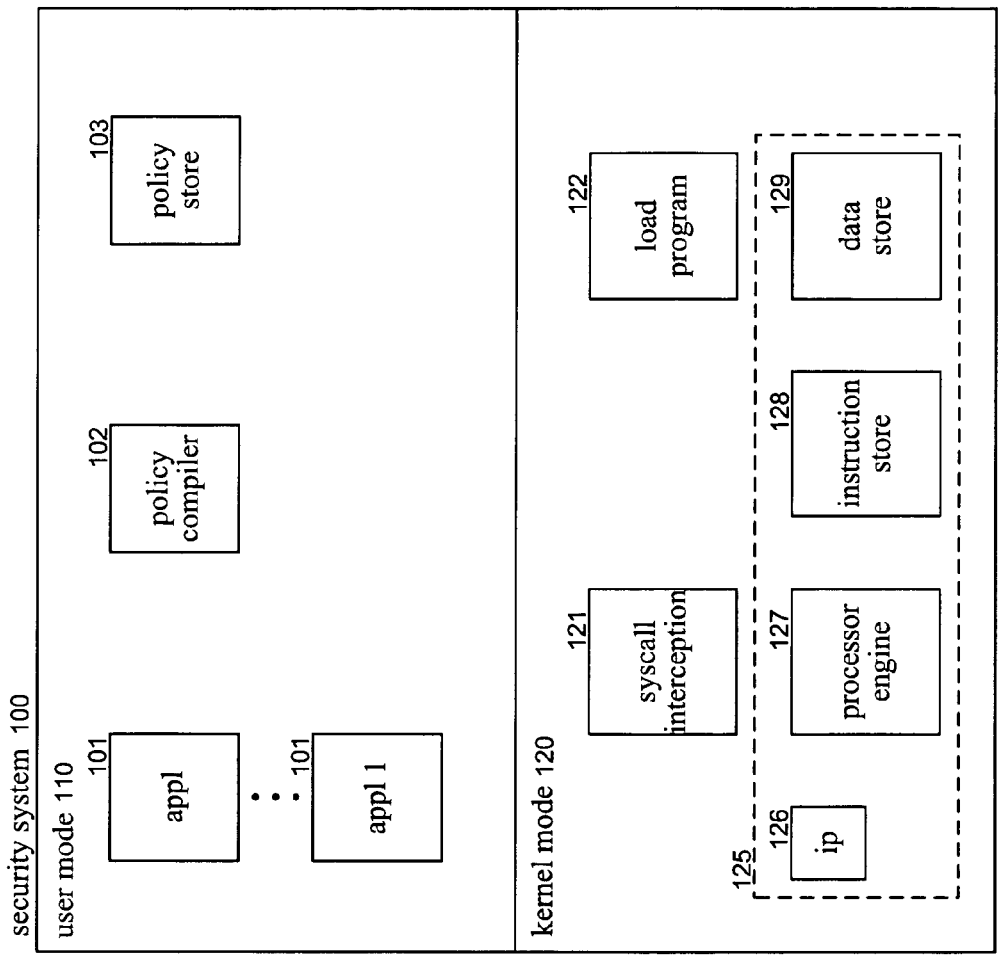
FIG. 1 is a block diagram that illustrates components of the security system in one embodiment.

A method and system in a computer system for enforcing a security policy encoded in an instruction set of a security virtual machine is provided. In one embodiment, a security system provides a security virtual machine that executes security programs expressed in the instruction set (i.e., intermediate language) of the security virtual machine. The security system may include a compiler that receives a security policy represented in a high-level language and generates a security program that is a representation of the security policy in the intermediate language of the security virtual machine. The security system stores the security program in an instruction store of the security virtual machine. When a security enforcement event occurs (i.e., an action that needs to be checked to ensure it complies with the security policy), the security virtual machine executes the instructions for the security program from its instruction store using data from the security enforcement event to enforce the security policy. If the security enforcement event indicates that an attempt is being made to perform an undesired behavior (e.g., an action that might exploit a vulnerability of an operating system), then the security program may block the attempt. In one embodiment, the security virtual machine of the security system executes in kernel mode of an operating system to identify and prevent attempts by applications and external systems to perform an undesired behavior for the computer system on which the security system is executing.

In one embodiment, the security system identifies when parameters of a system call issued by an application to a system service (e.g., file system and memory management system) may lead to an undesired behavior. The security policy contains rules that each specify a condition based on parameters of the system call and an action to take when the condition is satisfied. For example, the condition of a rule may be satisfied when a file create system call is issued with a parameter specifying a file size greater than 1 GB. The action associated with that rule may be to block the creation of the file. The high-level language may be an XML-based language, and each rule may be identified by rule, condition, and action tags. When the rules of the security policy represented in the high-level language are compiled, each rule is translated into instructions of the intermediate language to form the security program. For example, a rule may be translated into a series of instructions. One that compares the system call to a value indicating that the function is "file create," one that compares a file size parameter to a constant with the value of 1 GB, and one that outputs an indication to block the system call.

In one embodiment, the security virtual machine includes a processor engine, an instruction store, an instruction pointer, and a data store. When initializing the security virtual machine to enforce the security policy, the security system loads the instruction store with a security program that implements the security policy. The security system also loads data of the security program into the data store. When a system call is received, the security system stores the parameters of the system call (including a value that identifies the system call) into the data store. The security system may also store process control information of the process that issued the system call into the data store. The security system initializes the instruction pointer to point to a start instruction of the security program. The processor engine starts the security program by fetching and executing the start instruction pointed to by the instruction pointer. Each instruction that is executed modifies the instruction pointer to point to the next instruction to be executed. The instructions reference the data of the data store to enforce the security policy. The execution of the security program generates an output action set that specifies the actions (e.g., block system call) that are to be taken to enforce the security policy.

In one embodiment, the security policy may comprise a sub-policy for each system call whose parameters are to be checked. The security system may compile each sub-policy into a separate security sub-program that can be loaded into the instruction store independently of the other security sub-programs. Each sub-policy may correspond to the security enforcement for a single system call. The security system may maintain a mapping of each system call to a start instruction pointer in the instruction store and a start data pointer to the data in the data store of the corresponding security sub-program. When enforcing the security policy on a system call, the security system initializes the instruction pointer to the corresponding start instruction pointer and the data pointer to the corresponding start data pointer. The security sub-programs can use instruction and data reference techniques that are relative to the instruction pointer and the data pointer. In this way, the instructions and data of each security sub-program are relocatable. In the following description, a single security program handles all system calls by decoding each system call and jumping to the appropriate instruction location to process that system call. One skilled in the art will appreciate that this described system can be adapted to support a sub-program for each system call.

FIG. 1 is a block diagram that illustrates components of the security system in one embodiment. The security system includes some components that execute in user mode 100 and others that execute in kernel mode 120. A policy compiler 102 is a component that executes in user mode to compile security policies of a policy store 103 into security programs that are executable by the security virtual machine. The kernel mode components include a system call intercept component 121, a load program component 122, and a security virtual machine 125. The security virtual machine includes an instruction pointer 126, a processor engine 127, an instruction store 128, and a data store 129. The load program component loads security programs compiled by the policy compiler into the instruction store of the security virtual machine, stores program data into the data store, and sets the start instruction pointer. The system call intercept component intercepts system calls issued by application programs 101 and stores the parameters of each system call and process control information of the application programs into the data store. After intercepting a system call and storing its parameters, the system call intercept component instructs the processor engine to execute the security program of the instruction store. The processor engine executes the security program by fetching instructions pointed to by the instruction pointer and performing the operations specified by the instructions. The operations include storing actions to be taken to enforce the security policy in an output action set of the data store. Upon completion of the execution of the security program, the system call intercept component performs the actions of the output action set.

The computing device on which the security system is implemented may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 illustrates an example of a suitable operating environment in which the security system may be implemented. This operating environment is only one example of a suitable operating environment and is not intended to suggest any limitation as to the scope of use or functionality of the security system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The security system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
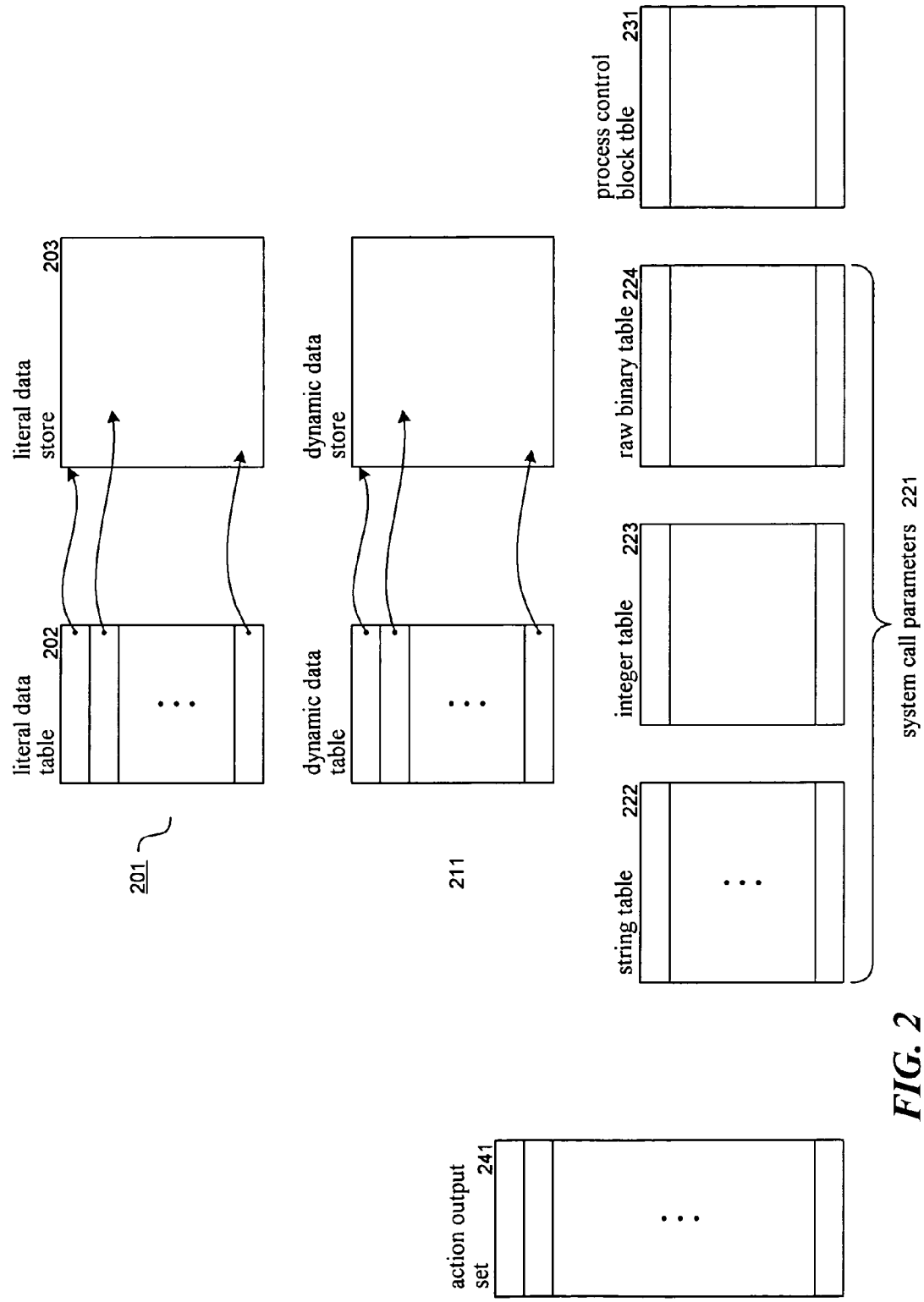
FIG. 2 is a block diagram that illustrates the data structure of the data store in one embodiment.

FIG. 2 is a block diagram that illustrates the data structure of the data store in one embodiment. The data store includes a literal data structure 201, a dynamic data structure 211, a system call parameters data structure 221, a process control block data structure 231, and an action output set 241. The literal data structure includes a literal data table 202 and a literal data store 203. The literal data table contains fixed-size entries that reference literal data stored in the literal data store. "Literal data" refers to data of the security program that is constant for the life of the currently loaded security policy. Literal data can only be changed by loading a new security policy. The dynamic data structure has a similar organization to the literal data structure, but it stores "dynamic" data rather than "literal data." "Dynamic data" refers to data of the security program that can be modified without loading a new security policy. For example, dynamic data may include the names of applications that are exempt from the security policy. Each entry of the literal and dynamic data tables points to data in the corresponding data store. The data of the literal and dynamic data stores are represented in a self-describing format. That format includes data type and data size information. In one embodiment, the security virtual machine supports data types of Boolean, integer, string, and raw binary (also referred to as "blob") in addition to arrays of integers, strings, and blobs. Instructions reference the literal and dynamic data using indexes into the literal and dynamic tables. When executing an instruction, the security virtual machine dereferences the index to the literal and dynamic table by retrieving the indexed entry and using its value as a pointer to the start of the data item in the literal or dynamic data store. Since data is self-describing, the type and size of data can be determined. The system call parameters data structure includes a string table 222, an integer table 223, and a raw binary table 224. The parameters of the system call are stored in these tables according to their data type. The process control block data structure is a table that contains an entry for each piece of process control information that is available to the security virtual machine. In one embodiment, the process control information includes an application identifier and a thread identifier. The action output set may be a set of action flags that is generated during execution of the security program and that indicate actions to be performed to enforce the security policy on the system call. The actions may include blocking the system call and notifying a user.

Figure 3:
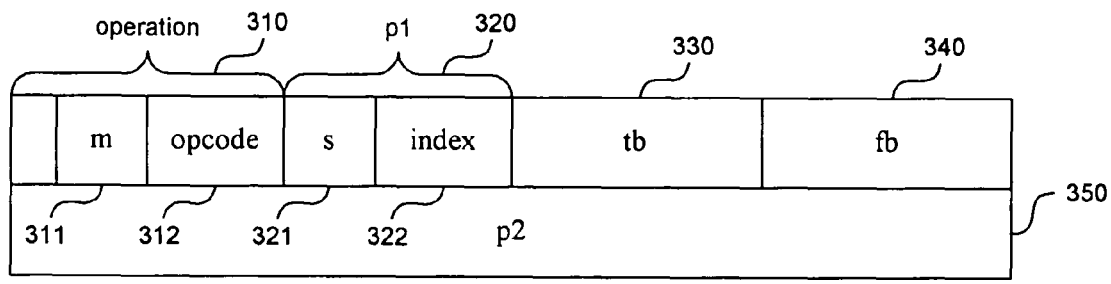
FIG. 3 is a diagram that illustrates the layout of an instruction of the security virtual machine in one embodiment.

FIG. 3 is a diagram that illustrates the layout of an instruction of the security virtual machine in one embodiment. Each instruction includes an operation field 310, a parameters field 320, a true branch field 330, a false branch field 340, and a parameter2 field 350. The parameters field references data associated with the system call (i.e., stored in the system call data structure or in the process control data structure), and the parameter2 field references data associated with the security program (i.e., immediate data or data stored in the literal or dynamic data structures). The operation field includes a parameter2 descriptor 311 ("m") and an operation code 312. The parameter2 descriptor specifies how to interpret parameter2. Parameter2 can contain immediate data, a reference to dynamic data, or a reference to literal data. When a reference is specified, the security virtual machine dereferences parameter2 before performing the operation of the instruction. The operation code identifies the operation of the instruction as defined below in more detail. The parameter1 field contains a parameter1 descriptor 321 ("s") and an index 322. The parameter1 descriptor indicates whether parameter1 refers to a system call parameter or to process control information. If the parameters descriptor indicates a system call parameter, then the high-order bits of the index specify whether the string table, integer table, or raw binary table of the system call parameters data structure is to be indexed, and the low-order bits indicate the indexed entry of the table. If the parameter1 descriptor indicates process control information, then the index indicates the specific process control information. The true branch field and the false branch field contain offsets that specify the next instruction to execute depending on whether the condition code of this instruction evaluates to true or false. The offset is added to the current instruction pointer to point to the next instruction to be executed.

Tables 1 and 2 illustrate the instructions of the security virtual machine in one embodiment. The instructions can be classified as those that perform a test on data and those that do not. Table 1 illustrates the nontest instructions.

TABLE 1

| Operation Code | Description | Parameters |
| --- | --- | --- |
| HALT | Stops processing | p2: status code |
| ACTION | Adds the action code to the output action set | p2: action code |
| JMP | Jumps to new instruction | p2: jump offset from current location |
| RESET | Clears the output action set | p2: ignored |

Table 2 illustrates the test instructions. The pattern instruction may define a regular expression for comparing two strings, which is useful for wildcard-type comparisons of file names (e.g., "*.DAT").

TABLE 2

| Operation Code | Description |
| --- | --- |
| TEST | boolean: test if p2 is TRUE |
| CMPEQ | integer: compare p1==p2 |
| CMPNE | integer: compare p1!=p2 |
| CMPLT | integer: compare p1<p2 |
| CMPLE | integer: compare p1<=p2 |
| CMPGE | integer: compare p1>=p2 |
| CMPGT | integer: compare p1>p2 |
| BLOB_MATCH | blob: p1==p2 |
| STRING_MATCH | string: p1==p2 |
| PATTERN_MATCH | string: p1 matches p2 wildcard-pattern |
| BLOB_MEMBEROF | blob: p1==p2[i] |
| INT_MEMBEROF | integer: p1==p2[i] |
| STRING_MEMBEROF | string: p1==p2[i] |
| PATTERN_MEMBEROF | string: p1 matches p2[i] wildcard-pattern |

Figure 4:
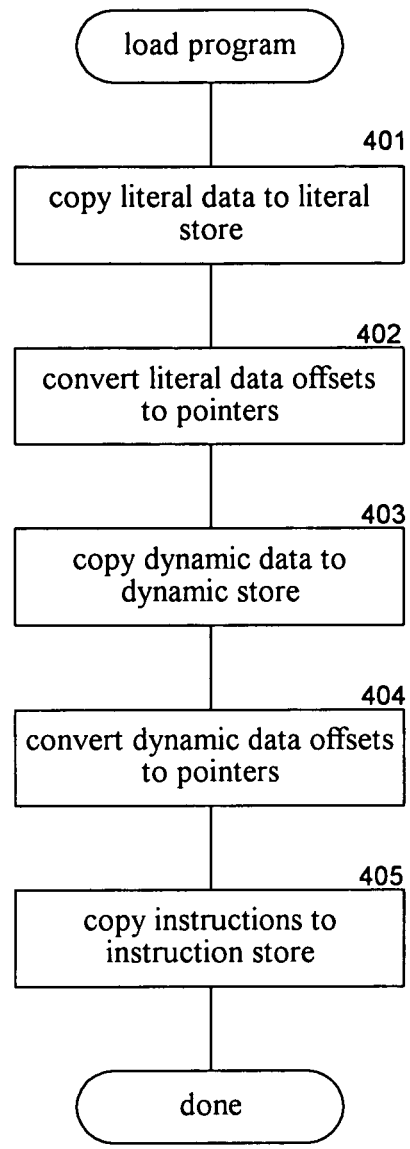
FIG. 4 is a flow diagram that illustrates the processing of the load program component in one embodiment.

FIG. 4 is a flow diagram that illustrates the processing of the load program component in one embodiment. The component is invoked when a security program is to be loaded into the security virtual machine. A security program contains virtual instructions, a literal data block, and a dynamic data block. The literal data block includes the information of the literal data table followed by the information of the literal data store. The component copies the literal data block to the literal store starting at a start location. The component then adds that base location to each offset in the literal data table to convert the offsets to pointers. The component processes the dynamic data block in a similar way. The virtual instructions contain offsets that are relative to the start of the literal store and the dynamic store. In block 401, the component identifies a start location within the literal store and copies the literal data block of the security program starting at that start location. In block 402, the component adds the start location to each offset of the literal data table to convert the offsets of the security program to pointers. In block 403, the component identifies a start location within the dynamic store and copies the dynamic data block of the security program starting at that start location. In block 404, the component adds the start location to each offset of the dynamic data table to convert the offsets of the security program to pointers. In block 405, the component copies the virtual instructions of the security program to the instruction store and then completes.

Figure 5:
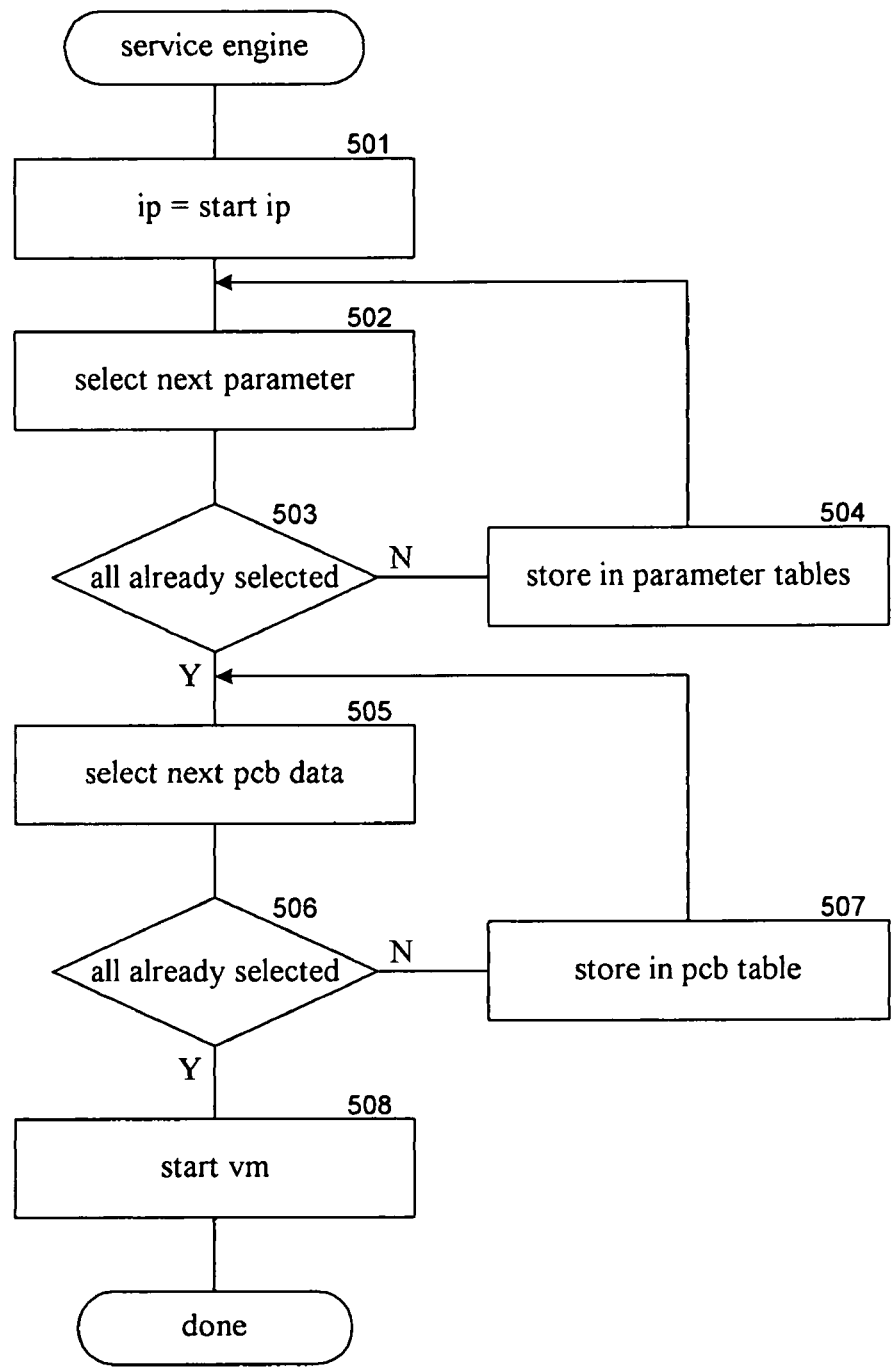
FIG. 5 is a flow diagram that illustrates the processing of the system call intercept component in one embodiment.

FIG. 5 is a flow diagram that illustrates the processing of the system call intercept component in one embodiment. The component is invoked when a system call is intercepted. The component initializes the system call parameter data structure and the process control data structure and then starts the security virtual machine. The component may also provide an instruction pointer of the instruction to start executing to process the system call. When security sub-programs are used, the component may have a mapping of system calls to the start instruction pointers and to start data pointers to the literal and dynamic data structures for that system call. The load program component may be called multiple times to load different sub-programs of the security program for processing different system calls. Since the instructions and data are offset based, the instructions and data can be stored in the next available locations of the instruction store and data structures. In block 501, the component sets the current instruction pointer to the start instruction pointer of the security program and resets the action output set to an initial state (e.g., empty). In blocks 502-504, the component loops storing the parameters of the system call into the system call parameters data structure. In block 502, the component selects the next parameter of the system call. In decision block 503, if all the parameters of the system call have already been selected, then the component continues at block 505, else the component continues at block 504. In block 504, the component stores the selected parameter in the appropriate table of the system call parameters data structure and then loops to block 502 to select the next parameter of the system call. In blocks 505-507, the component loops storing process control information in the process control data structure. In block 505, the component selects the next process control information for the process that placed the system call. In decision block 506, if all the process control information has already been selected, then the component continues at block 508, else the component continues at block 507. In block 507, the component stores the selected process control information into the process control data structure and then loops to block 505 to select the next process control information. Alternatively, rather than using and initializing an internal process control data structure, the security system may retrieve process control information directly from a process control block when needed. One skilled in the art will appreciate that a process control block is created by an operating system when a process is created. In block 508, the component launches the security virtual machine to enforce the security policy on the intercepted system call. Upon completion of the execution of the security program by the security virtual machine, the component performs the actions of the action output set.

Figure 6:
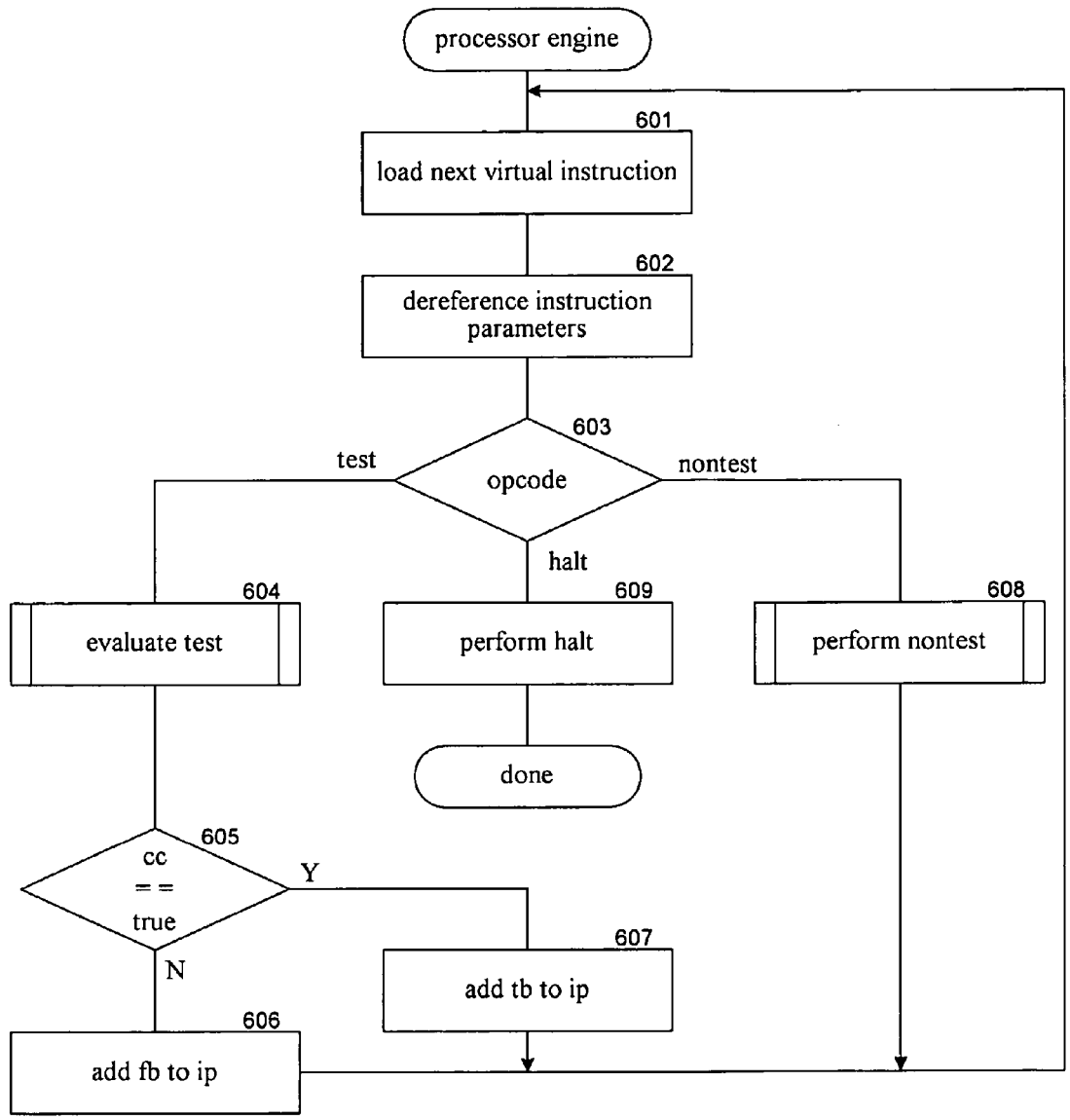
FIG. 6 is a flow diagram that illustrates the processing of the processor engine of the security virtual machine in one embodiment.

FIG. 6 is a flow diagram that illustrates the processing of the processor engine of the security virtual machine in one embodiment. The processor engine initializes the system call parameter data structure based on the intercepted system call, launches the security virtual machine, and performs the actions of the output action set. In blocks 601-607, the processor engine loops loading and executing the instructions of the security program stored in the instruction store until a halt instruction is executed. In one embodiment, the security policy may define that, whenever a condition of a rule is satisfied, no other rules are tested. In block 601, the processor engine fetched of the instruction pointed to by the current instruction pointer. In block 602, the processor engine invokes a component to dereference parameter1 and parameter2. In decision block 603, if the operation code of the instruction is a test operation, then the processor engine continues at block 604. If the operation code of the instruction is a nontest operation (except for a halt operation), then the processor engine continues at block 608. If the operation code of the instruction is a halt operation, then the processor engine continues at block 609. In block 604, the processor engine invokes the evaluate test component to determine whether the test operation evaluates to true or false. The invoked component sets a condition code flag to true or false. In decision block 605, if the condition code is true, then the processor engine continues at block 607, else the processor engine continues at block 606. In block 606, the processor engine adds the offset of the false branch field to the current instruction pointer and then loops to block 601 to fetch the next instruction. In block 607, the processor engine adds the offset of the true branch field to the current instruction pointer and then loops to block 601 to fetch the next instruction. In block 608, the processor engine invokes the perform nontest component and then loops to block 601 to fetch the next instruction. The perform nontest component performs the operation of the instruction and sets the current instruction pointer to point to the next instruction to be executed. The perform non-test component adds the offset of the true branch (or parameter2 in the case of a jump instruction) of the instruction to the instruction pointer. In block 609, the component performs the halt instruction and then completes.

Figure 7:
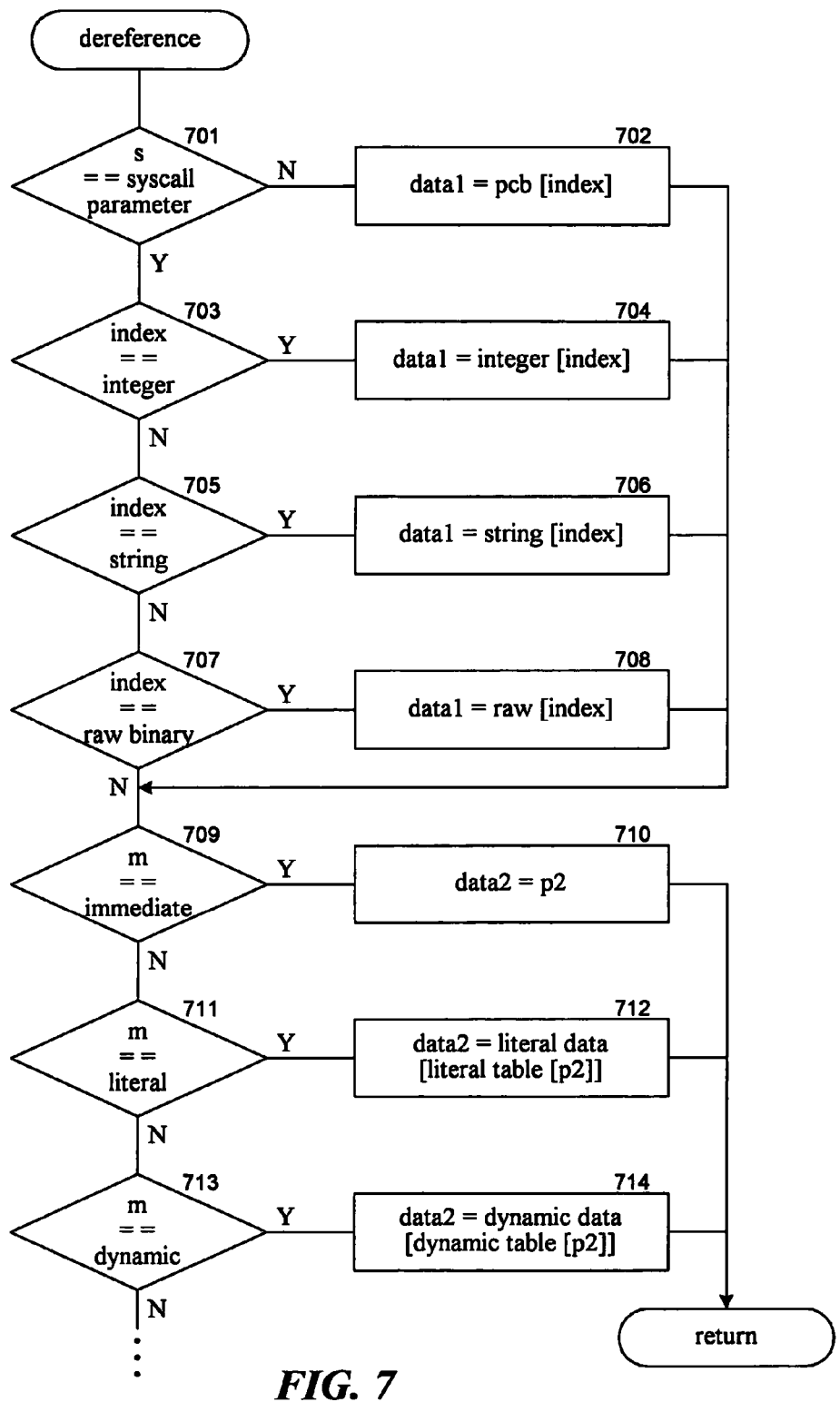
FIG. 7 is a flow diagram that illustrates the processing of the dereference component of the security virtual machine in one embodiment.

FIG. 7 is a flow diagram that illustrates the processing of the dereference component of the security virtual machine in one embodiment. This component dereferences parameter1 and parameter2 of the fetched instruction. In blocks 701-708, the component dereferences parameters. In decision block 701, if parameter1 is a system call parameter as indicated by the parameter1 descriptor, then the component continues at block 703, else the component continues at block 702. In block 702, the component sets the dereferenced parameters to the process control information specified by the index of parameters and then continues at block 709. In decision block 703, if the index of parameter1 indicates that the system call parameter is an integer, then the component continues at block 704, else the component continues at block 705. In block 704, the component sets the dereferenced parameter1 to the integer specified by the index and continues at block 709. In decision block 705, if the index of parameter1 indicates that the system call parameter is a string, then the component continues at block 706, else the component continues at block 707. In block 706, the component sets the dereferenced parameter1 to the string specified by the index and continues at block 709. In decision block 707, if the index of parameter1 indicates that the system call parameter is raw binary, then the component continues at block 708, else an error has occurred. In block 708, the component sets the dereferenced parameters to the raw binary specified by the index and continues at block 709. In blocks 709-714, the component dereferences parameter2. In decision block 709, if the parameter2 descriptor indicates immediate data, then the component continues at block 710, else the component continues at block 711. In block 710, the component sets the dereferenced parameter2 to the value of parameter2 in the fetched instruction and then returns. In decision block 711, if the parameter2 descriptor indicates literal data, then the component continues at block 712, else the component continues at block 713. In block 712, the component sets the dereferenced parameter2 to the literal data specified by parameter2 in the fetched instruction and then returns. In decision block 713, if the parameter2 descriptor indicates dynamic data, then the component continues at block 714, else an error has occurred. In block 714, the component sets the dereferenced parameter2 to the dynamic data specified by parameter2 in the fetched instruction and then returns.

Figure 8:
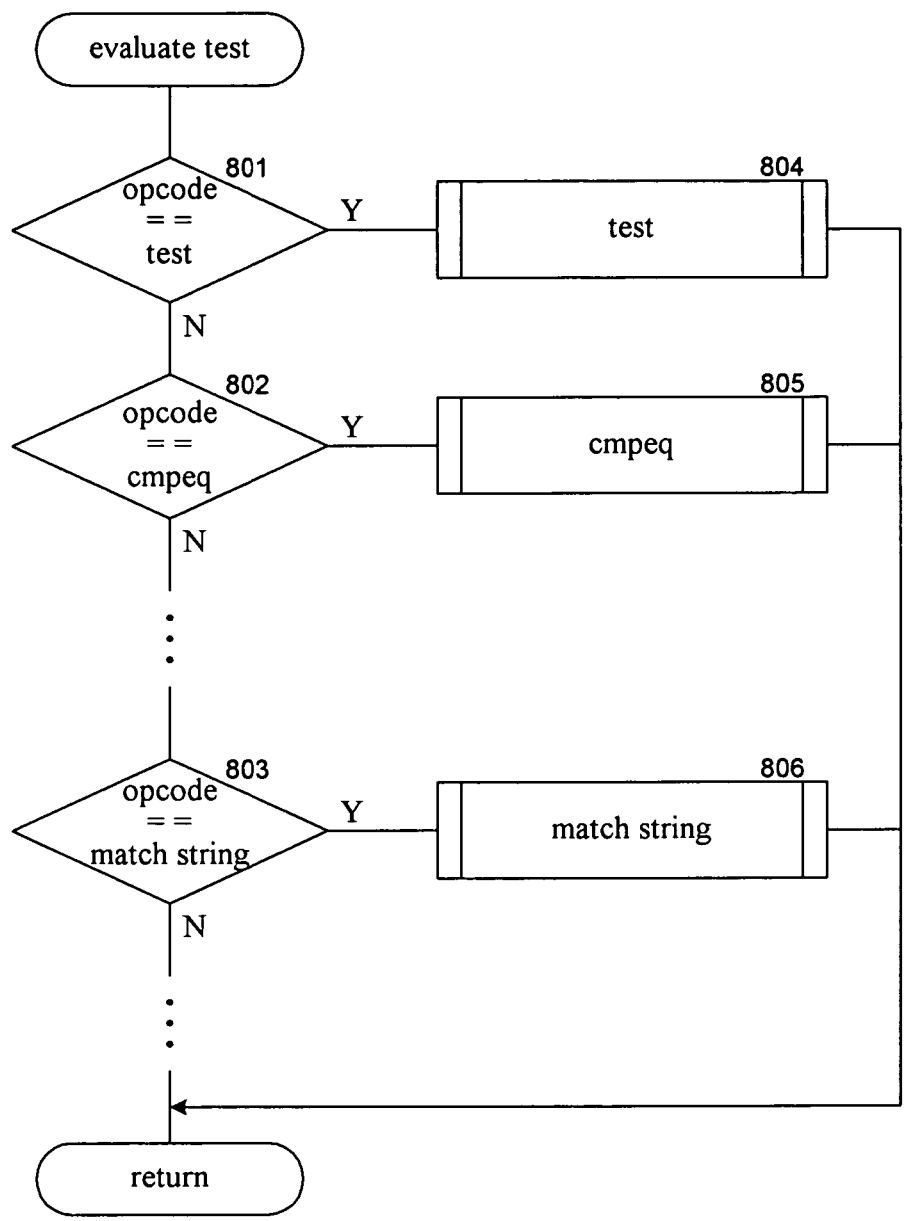
FIG. 8 is a flow diagram that illustrates the processing of the evaluate test component of the security virtual machine in one embodiment.

FIG. 8 is a flow diagram that illustrates the processing of the evaluate test component of the security virtual machine in one embodiment. The component decodes the operation code of the loaded instruction and invokes a component to implement a test of that operation code. The invoked component sets the condition code to true or false. In decision blocks 801-803, the component decodes the operation code of the loaded instruction. In blocks 804-806, the component invokes the components to implement the decoded operation code and then returns.

Figure 9:
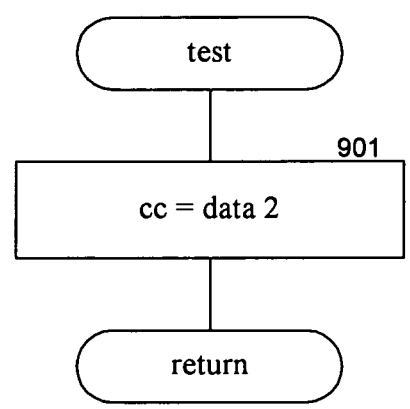
FIG. 9 is a flow diagram that illustrates the processing of the test component of the security virtual machine in one embodiment.

FIG. 9 is a flow diagram that illustrates the processing of the test component of the security virtual machine in one embodiment. The test component implements the test operation code. In block 901, the component sets the condition code to the value of the dereferenced parameter2 and then returns.

Figure 10:
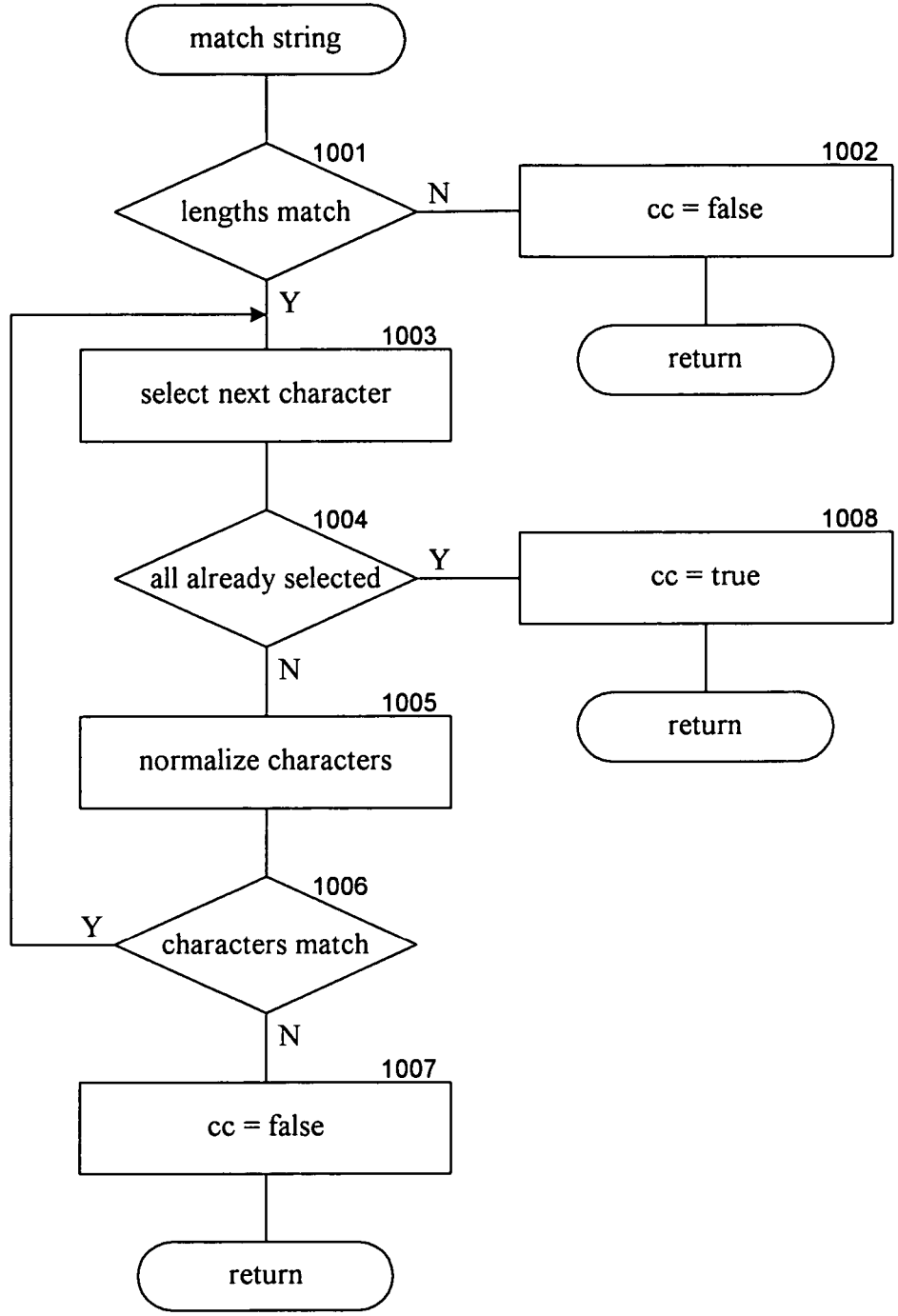
FIG. 10 is a flow diagram that illustrates the processing of the match string component of the security virtual machine in one embodiment.

FIG. 10 is a flow diagram that illustrates the processing of the match string component of the security virtual machine in one embodiment. The component determines whether the dereferenced parameter1 matches the dereferenced parameter2. In one embodiment, the security virtual machine may use pattern matching. For example, a parameter may include a "wild card" specification or more generally a regular expression. In decision block 1001, if the lengths of parameter1 and parameter2 match, then the component continues at block 1003, else the dereferenced parameters cannot match and the component continues at block 1002. In block 1002, the component sets the condition code to false and then returns. In blocks 1003-1006, the component loops checking each character of the strings of the dereferenced parameters. In block 1003, the component selects the next character of each string. In decision block 1004, if all the characters of the strings have already been selected, then the component continues at block 1008, else the component continues at block 1005. In block 1005, the component normalizes the selected characters. For example, the component may put each character into lowercase to implement a case insensitive comparison. In decision block 1006, if the selected characters match, then the component loops to block 1003 to select the next character of the strings, else the component continues at block 1007. In block 1007, the component sets the condition code to false and then returns. In block 1008, all the characters of the strings match and the component sets the condition code to true and then returns.

Figure 11:
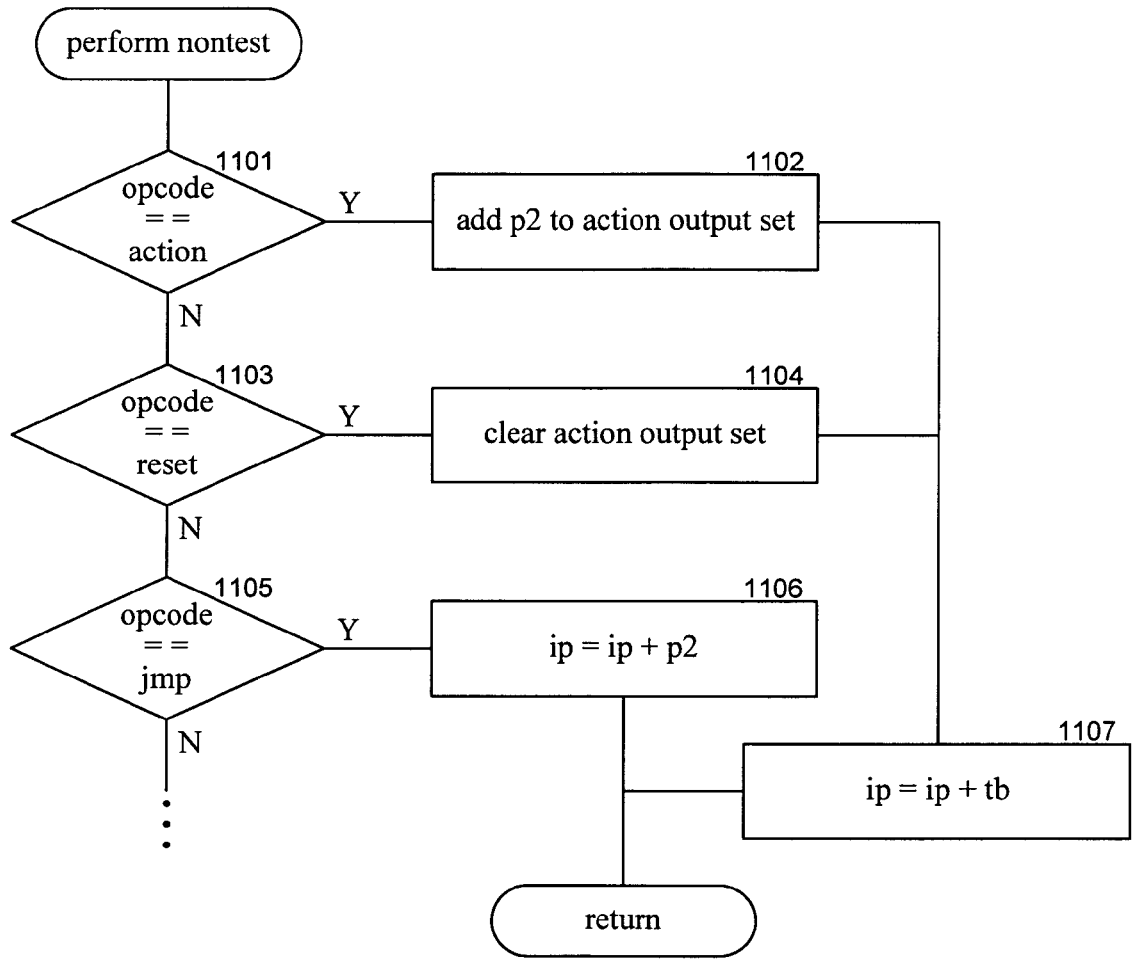
FIG. 11 is a flow diagram that illustrates the processing of the nontest component of the security virtual machine in one embodiment.

FIG. 11 is a flow diagram that illustrates the processing of the nontest component of the security virtual machine in one embodiment. The component performs the operation of the nontest operation code of the fetched instruction, including setting the current instruction pointer to point to the next instruction to execute. In decision block 1101, if the operation code is an action operation, then the component continues at block 1102, else the component continues at block 1103. In block 1102, the component adds parameter2 of the fetched instruction to the action output set and then continues at block 1107. In decision block 1103, if the operation code is a reset operation, then the component continues at block 1104, else the component continues at block 1105. In block 1104, the component clears the action output set and then continues at block 1107. In decision block 1105, if the operation code is a jump operation, then the component continues at block 1106, else the component continues to decode further operation codes. In block 1106, the component adds parameter2 to the current instruction pointer and then returns. In block 1107, the component adds the value of the true branch field to the current instruction pointer and then returns.

One skilled in the art will appreciate that although specific embodiments of the security system have been described herein for purposes of illustration, various modifications may be made without deviating from the spirit and scope of the invention. One skilled in the art will appreciate that a security system using a security virtual machine can be used to enforce a wide variety of security policies. For example, the security system can be used to enforce security of messages received via a network, transactions received by a transaction processor, and more generally any application that provides an application programming interface. Accordingly, the invention is not limited except by the appended claims.

I claim:

1. A method in a computing device for enforcing a security policy, the computing device having a first instruction set, the method comprising:
providing a security policy in a high-level language, the security policy indicating parameters of system calls that may lead to an undesirable behavior;
compiling the security policy in the high-level language into a security program based on a second instruction set of a security virtual machine, the second instruction set of the security virtual machine being different from the first instruction set of the computing device, the security virtual machine being implemented using instructions of the first instruction set of the computing device;
loading by the computing device the security program into an instruction store of the security virtual machine; and
under control of an operating system executing on the computing device in kernel mode,
receiving by the operating system from an application executing on the computing device in user mode an indication of the invocation of a system call of the operating system with a parameter, the invocation being a security enforcement event that occurs during execution of the application outside of the security virtual machine; and
upon receiving the invocation and under control of the security virtual machine with its instructions of the first instruction set being executed by the computing device while in kernel mode,
executing by the security virtual machine the security program of the instruction store based on data of the security enforcement event that includes an indication of the system call and the parameter to ensure that the security enforcement event complies with the security policy;
when the security enforcement event complies with the security policy, allowing invocation of the system call; and
when the security enforcement event does not comply with the security policy, blocking invocation of the system call.

2. The method of claim 1 wherein process control information of an application that places the system call is the data of the security enforcement event.

3. The method of claim 1 wherein data of the security program is stored in a literal data structure.

4. The method of claim 3 wherein an instruction of the second instruction set contains a reference to literal data stored in the literal data structure.

5. The method of claim 1 wherein data of the security program is stored in a dynamic data structure.

6. The method of claim 5 wherein an instruction of the second instruction set contains a reference to dynamic data stored in the dynamic data structure.

7. The method of claim 1 wherein an instruction of the second instruction set identifies a location of the next instruction to execute.

8. The method of claim 1 wherein the security virtual machine supports Boolean, integer, string, and raw binary data types.

9. The method of claim 1 wherein the security virtual machine supports regular expression pattern matching comparisons.

10. The method of claim 1 wherein the execution of the security program creates an output action set that specifies how to handle the security enforcement event.

11. The method of claim 1 wherein an instruction of the second instruction set includes an operation code, parameters, and branch fields.

12. The method of claim 11 wherein the branch fields include a true branch field that specifies the next instruction when a condition of the instruction evaluates to true and a false branch field that specifies the next instruction when the condition of the instruction evaluates to false.

13. A method in a computing device for enforcing a security policy, the computing device having a first instruction set, the method comprising:
   providing a security policy in a high-level language, the security policy indicating parameters of system calls that may lead to an undesirable behavior, the security policy being compiled from the high-level language into a security program based on a second instruction set of a security virtual machine, the second instruction set of the security virtual machine being different from the first instruction set of the computing device, the security virtual machine being implemented using instructions of the first instruction set of the computing device that are executed directly by a central processing unit of the computing device;
   loading by the computing device the security program into an instruction store of the security virtual machine;
   under control of an application executing on the computing device in user mode of the computing device and outside of the security virtual machine, invoking a system call of an operating system implemented using instructions of the first instruction set of the computing device that are executed directly by a central processing unit of the computing device executing on the computing device, the system call including a parameter; and
   while in kernel mode of the computing device and under control of the operating system,
      receiving by the operating system from the application executing on the computing device in user mode an indication of the invocation of the system call of the operating system with a parameter, the invocation being a security enforcement event that occurs during execution of the application, the application being implemented using instructions of the first instruction set of the computing device that are executed directly by a central processing unit of the computing device; and
      upon receiving the invocation of the system call of the operating system, launching execution of the security virtual machine in kernel mode;
      during execution of the security virtual machine in kernel mode, executing the instructions of the second instruction set of the instruction store based on data of the security enforcement event that includes a parameter to ensure that the security enforcement event complies with the security policy; and
      after execution of the security virtual machine is halted,
         when the security enforcement event complies with the security policy, performing of the system call; and
         when the security enforcement event does not comply with the security policy, blocking performance of the system call.

14. A computer-readable storage device storing computer-executable instructions for controlling a computing device to enforce a security policy, the computing device having a first instruction set, by a method comprising:
   accessing a security policy in a high-level language, the security policy indicating parameters of system calls that may lead to an undesirable behavior;
   compiling the security policy in the high-level language into a security program based on a second instruction set of a security virtual machine, the second instruction set of the security virtual machine being different from the first instruction set of the computing device, the second instruction set including instructions with an operation code field, a first parameter field that references data associated with a system call, and a second parameter field that references data associated with the security program, the security virtual machine being implemented using instructions of the first instruction set of the computing device;
   loading the security program into an instruction store of the security virtual machine; and
   while in kernel mode of the computing device and under control of an operating system executing on the computing device,
   receiving from an application executing on the computing device in user mode an invocation of a system call of the operating system with parameters, the invocation being a security enforcement event that occurs during execution of the application outside of the security virtual machine; and
   upon receiving the invocation and under control of the security virtual machine with its instructions of the first instruction set being executed by the computing device while in kernel mode,
      executing the instructions of the second instruction set of the instruction store based on data of the security enforcement event that includes a parameter to ensure that the security enforcement event complies with the security policy;
      when the security enforcement event complies with the security policy, allowing invocation of the system call; and
      when the security enforcement event does not comply with the security policy, blocking invocation of the system call.

15. The computer-readable storage device of claim 14 wherein process control information of an application that places the system call is the data of the security enforcement event.

16. The computer-readable storage device of claim 14 wherein data of the security program is stored in a literal data structure.

17. The computer-readable storage device of claim 16 wherein an instruction of the second instruction set contains a reference to literal data stored in the literal data structure.

18. The computer-readable storage device of claim 14 wherein data of the security program is stored in a dynamic data structure.

19. The computer-readable storage device of claim 18 wherein an instruction of the second instruction set contains a reference to dynamic data stored in the dynamic data structure.

20. A computer-readable storage device storing computer-executable instructions for controlling a computing device to enforce a security policy, the computing device having a first instruction set, by a method comprising:

storing a security program into an instruction store of a security virtual machine, the security virtual machine having a second instruction set that is different from the first instruction set and the security program having instructions of the second instruction set;

intercepting issuance by an application of a system call for a system service of an operating system, the application executing in user mode of the computing device, the issuance being a security enforcement event that occurs during execution of the application in user mode and outside of the security virtual machine; and while in kernel mode of the computing device,
receiving an indication of the security enforcement event;
executing by the security virtual machine the instructions of the security program stored into the instruction store to determine whether the security enforcement event complies with the security policy;
when the security enforcement event complies with the security policy, allowing the system call to proceed; and
when the security enforcement event does not comply with the security policy, blocking the system call.

* * * * *